United States Patent
Al-Jodai et al.

(10) Patent No.: US 11,285,428 B2
(45) Date of Patent: Mar. 29, 2022

(54) PROCESS FOR SEPARATION OF HYDROGEN AND OXYGEN

(71) Applicant: SABIC Global Technologies B.V., Bergen op Zoom (NL)

(72) Inventors: Abdulaziz M. Al-Jodai, Riyadh (SA); Nasser Ali Aldalaan, Riyadh (SA); Mubarik Ali Bashir, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 901 days.

(21) Appl. No.: 16/073,139

(22) PCT Filed: Jan. 6, 2017

(86) PCT No.: PCT/IB2017/050064
§ 371 (c)(1),
(2) Date: Jul. 26, 2018

(87) PCT Pub. No.: WO2017/134535
PCT Pub. Date: Aug. 10, 2017

(65) Prior Publication Data
US 2020/0353403 A1  Nov. 12, 2020

Related U.S. Application Data

(60) Provisional application No. 62/290,136, filed on Feb. 2, 2016.

(51) Int. Cl.
*B01D 53/047* (2006.01)
*C01B 3/02* (2006.01)
(Continued)

(52) U.S. Cl.
CPC .......... *B01D 53/0476* (2013.01); *C01B 3/042* (2013.01); *C01B 3/508* (2013.01); (Continued)

(58) Field of Classification Search
CPC .. B01D 53/04; B01D 53/0476; B01D 53/047; B01D 2253/102; B01D 2253/108; (Continued)

(56) References Cited

U.S. PATENT DOCUMENTS 3,788,037 A  1/1974 Shell et al.
3,969,481 A * 7/1976 Murray ............... C01B 3/56
423/219
(Continued)

FOREIGN PATENT DOCUMENTS

JP  2003327401  11/2003
WO  WO 2010079726  7/2010

OTHER PUBLICATIONS

Belloni, "Adsorption: A Successful and Versatile Separation Technique Continously Improved at Linde," Chemie Ingenieur Technik, 83(1-2), 29-35, 2011.
(Continued)

*Primary Examiner* — Frank M Lawrence, Jr.
(74) *Attorney, Agent, or Firm* — Norton Rose Fulbright US LLP

(57) ABSTRACT

Embodiments of the invention are directed to methods, processes, and systems for safely and reliably purifying hydrogen from a gas mixture containing hydrogen and oxygen.

17 Claims, 1 Drawing Sheet

(51) Int. Cl.
*C01B 3/04* (2006.01)
*C01B 3/50* (2006.01)
*C01B 13/02* (2006.01)

(52) U.S. Cl.
CPC ........ *C01B 13/027* (2013.01); *C01B 13/0266* (2013.01); *B01D 2253/102* (2013.01); *B01D 2253/108* (2013.01); *B01D 2253/112* (2013.01); *B01D 2256/12* (2013.01); *B01D 2256/16* (2013.01); *C01B 2203/042* (2013.01); *C01B 2203/1288* (2013.01); *C01B 2210/0017* (2013.01); *C01B 2210/0018* (2013.01); *C01B 2210/0042* (2013.01); *C01B 2210/0062* (2013.01)

(58) Field of Classification Search
CPC ........ B01D 2253/112; B01D 2253/116; B01D 2256/12; B01D 2256/16; B01D 2257/104; B01D 2257/108; C01B 3/0005; C01B 3/042; C01B 3/508; C01B 3/56; C01B 13/0207; C01B 13/0266; C01B 13/027; C01B 2203/042; C01B 2203/1288; C01B 2210/0017; C01B 2210/0018; C01B 2210/0042; C01B 2210/0062; Y02E 60/32; Y02E 60/36
USPC .................. 95/96, 138; 96/108, 121, 134; 423/648.1, 644
See application file for complete search history.

(56) References Cited

U.S. PATENT DOCUMENTS

| | | | |
|---|---|---|---|
| 4,476,105 | A | 10/1984 | Greenbaum |
| 4,477,265 | A | 10/1984 | Kumar et al. |
| 5,093,302 | A | 3/1992 | Sasao et al. |
| 6,296,688 | B1 | 10/2001 | Cheng et al. |
| 6,406,520 | B1 | 6/2002 | Lledos |
| 6,660,064 | B2 | 12/2003 | Golden et al. |
| 10,882,742 | B2 * | 1/2021 | Aldalaan ............ C01B 13/0281 |
| 2004/0107831 | A1 | 6/2004 | Graham et al. |
| 2006/0048808 | A1 | 3/2006 | Ruckman |
| 2008/0311015 | A1 | 12/2008 | Hoffman et al. |
| 2009/0223371 | A1 * | 9/2009 | Nakao .................. B01D 53/047 96/130 |
| 2009/0274600 | A1 | 11/2009 | Jain et al. |
| 2013/0248349 | A1 | 9/2013 | Mui et al. |
| 2013/0252121 | A1 | 9/2013 | Oppenheim |
| 2016/0175761 | A1 * | 6/2016 | Shimizu ............ B01D 53/0476 95/96 |

OTHER PUBLICATIONS

International Search Report and Written Opinion Issued in Corresponding PCT Application No. PCT/IB2017/050064, dated Mar. 31, 2017.

* cited by examiner

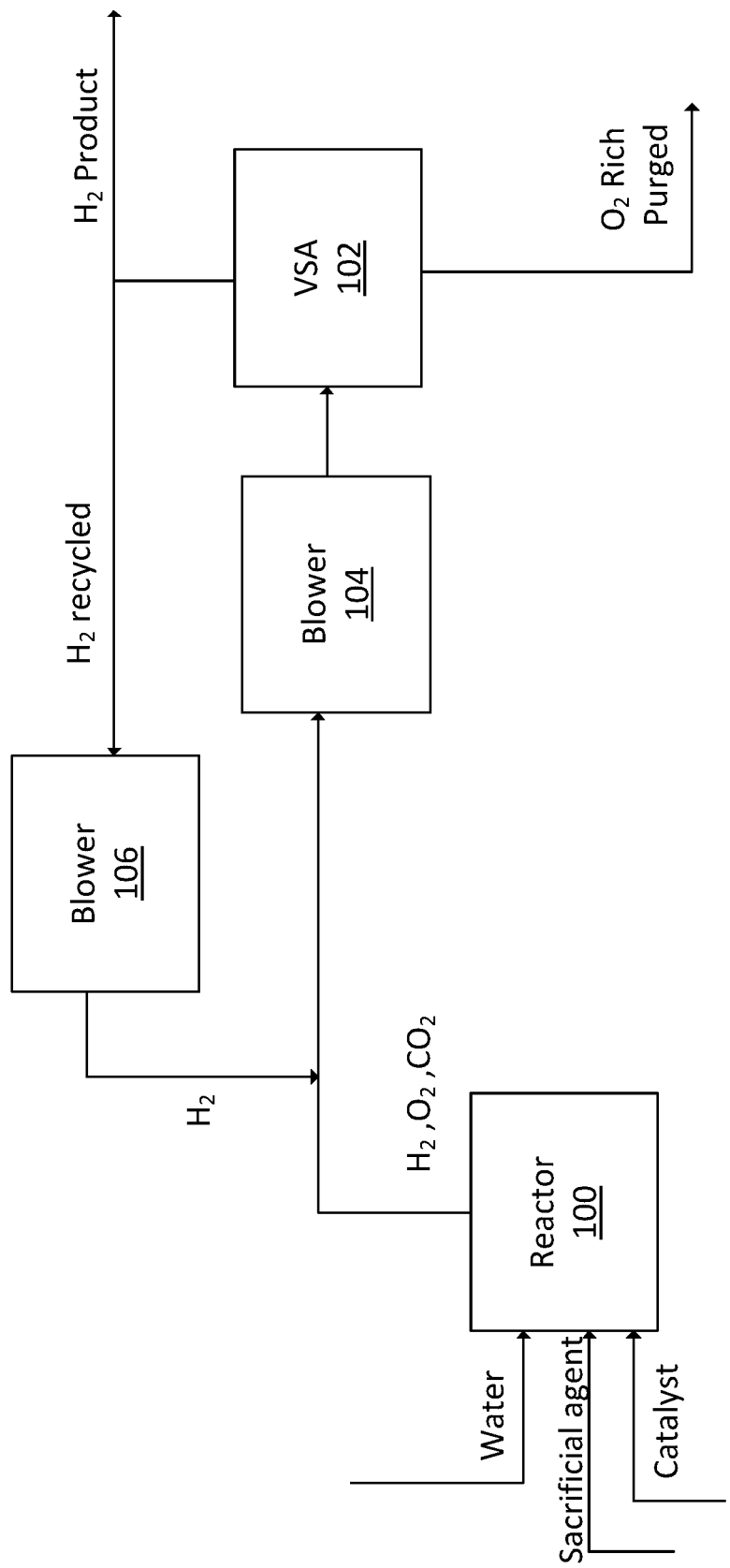

PROCESS FOR SEPARATION OF HYDROGEN AND OXYGEN

CROSS-REFERENCE TO RELATED APPLICATIONS

This application is a national phase application under 35 U.S.C. § 371 of International Application No. PCT/IB2017/050064 filed Jan. 6, 2017, which claims the benefit of priority of U.S. Provisional Patent Application No. 62/290,136, filed Feb. 2, 2016. The entire contents of each of the above-referenced disclosures are specifically incorporated herein by reference.

BACKGROUND

Hydrogen fuel production has gained increased attention as oil and other nonrenewable fuels become increasingly depleted and expensive. Methods such as photocatalytic water splitting are being investigated for production of hydrogen fuel, which burns cleanly and can be used in a hydrogen fuel cell. Water splitting holds particular interest since it utilizes water, an inexpensive renewable resource.

Technologies are currently under development for producing energy from renewable and sustainable resources such as water. Water can be used as a feedstock for photocatalytic splitting using sun light to split water molecules into hydrogen and oxygen. There is currently a lack of commercial methods or technologies for purifying hydrogen gas produced via this process. The process produces a highly explosive gas mixture, which requires using an as yet defined techniques and/or system to separate and purify hydrogen from oxygen. The currently known methods for separating the gas mixture produced by water lack reliability and safety, and are considered unrealistic from engineering point of view.

Thus, there remains a need for additional methods, processes, and systems for purifying hydrogen from a gas mixture containing hydrogen and oxygen.

SUMMARY

Embodiments of the current disclosure relate to methods, processes, and systems for safely and reliably purifying hydrogen from a gas mixture containing hydrogen and oxygen, such as that produced by the photocatalytic water splitting process. The solution separates a highly flammable and explosive gas containing hydrogen and oxygen using a vacuum swing adsorption (VSA) method, process, and system. The adsorption process provides for separating a multi-component gas stream containing at least two gases having different adsorption characteristics. The more strongly adsorbable gas can be an impurity which is removed from the less strongly adsorbable gas which is taken off as product; or, the more strongly adsorbable gas can be the desired product, which is separated from the less strongly adsorbable gas.

Certain embodiments are directed to a process for producing hydrogen from water that includes one or more of the following steps: (a) contacting a water source with a water splitting photocatalyst and exposing the water and photocatalyst to light under conditions that split water into hydrogen and oxygen forming a feed source for hydrogen separation and purification; (b) separating hydrogen and oxygen at about atmospheric pressure from the feed source by (i) passing the feed source through and/or over an adsorption medium that differentially adsorbs oxygen or hydrogen producing an enriched hydrogen or oxygen product gas and an adsorbed oxygen or hydrogen enriched adsorption medium, respectively; and (ii) desorbing the adsorbed oxygen or hydrogen and regenerating the adsorption medium by exposing the oxygen or hydrogen enriched adsorption medium to a vacuum forming an oxygen or hydrogen enriched purge gas and a regenerated adsorption medium; and (c) collecting, storing, and/or utilizing the hydrogen enriched product/purge gas and oxygen enriched product/purge gas. In certain aspects the separation step can include mixing the feed source with hydrogen, reducing the combustibility of the feed source. In certain aspects the hydrogen in the feed gas is elevated above 75% hydrogen by volume or the oxygen content is reduced to below 1% oxygen by volume. Adsorption is carried out at ambient pressure (approximately 1 bar) and temperature, that is the feed source and adsorption chamber are not actively compressed or pressurized, or actively heated or cooled. In certain aspects the adsorption process is performed at about 15 to 60° C. In a further aspect the adsorption process is performed at about 20 to 40° C. In still a further aspect the desorption process is performed at about 15 to 60° C. In certain aspects the desorption process is performed at about 20 to 40° C. The adsorption process can be performed at a pressure of about 0.8 to 1.2 bar (about atmospheric pressure). In certain aspects the adsorption process is performed at a pressure of about 1 bar. The desorption process can be performed at a pressure of about 0.1 mbar to 0.5 bar. In certain aspects the desorption process is performed at about 0.1 bar. The process can further comprise filtering and dehydrating the feed source prior to separating hydrogen and oxygen. The feed source can comprises about or at least 50, 60, 70, or 80 mol % hydrogen. A hydrogen product gas can comprises about or at least 90, 92, 94, 96, 98, up to 99.5 mol % hydrogen. In certain aspects the process or certain steps of the process are performed under conditions and using equipment to minimize spark generation.

The adsorption medium can comprise a molecular sieve that selectively adsorbs oxygen or hydrogen at pressures of about 1 bar. In certain aspects the adsorption medium comprises a carbon molecular sieve (CMS), a zeolite, or both a CMS and a zeolite. The adsorption medium selectively adsorbs components of the feed source (e.g., oxygen or hydrogen), while allowing other components to pass. The adsorption medium can comprises molecular sieve material(s) that selectively adsorbs oxygen or hydrogen at about atmospheric pressure as well as desorb oxygen or hydrogen at a reduced pressure (i.e., a pressure below 0.5 bar). The molecular sieve can be a carbon molecular sieve (CMS) or a zeolite. In certain aspects the adsorption medium comprises both a CMS and a zeolite. Molecular sieves can be defined as substances with discrete pore structures that can discriminate between molecules on the basis of size and/or adsorption characteristics. CMS is a special class of amorphous activated carbon. One feature of CMSs is that they provide molecular separations based on rate of adsorption rather than on the differences in adsorption capacity. Zeolites are aluminosilicate minerals with complex crystal structures made up of interlocking rings of silicon, aluminum and oxygen ions. In certain aspects the zeolite is a 5A zeolite. Once the adsorption medium is saturated the adsorbed gas can be recovered and the adsorption medium regenerated by applying a vacuum to the adsorption medium and allowing the adsorbate to desorb. The cyclic adsorption and regeneration using a vacuum to desorb is referred to as vacuum swing adsorption.

Certain embodiments are directed to a purified hydrogen product gas produced by the process described above and having at least 90, 95, 99, to 99.5 mol % hydrogen.

Other embodiments are directed to a purified oxygen product gas produced by the process described above and having at least 40, 50, 60, or 70 mol % oxygen.

Further embodiments are directed to a hydrogen purification system that includes one or more of: (a) a photocatalytic reactor configured for splitting water into hydrogen and oxygen; (b) a vacuum swing adsorption (VSA) unit configured to operate at approximately ambient pressure or under a vacuum comprising an adsorption medium that selectively adsorbs oxygen or hydrogen, the VSA unit configured to (i) receive a feed source at a pressure of at or about atmospheric pressure and (ii) produce an enriched hydrogen or oxygen stream; and (c) a blower configured (i) to introduce a feed source to the VSA unit from the photocatalytic reactor to produce an enriched gas stream, or (ii) to apply a vacuum for regenerating the adsorption medium and producing a second enrich gas stream comprising the absorbed gases. In certain embodiment the system can employ two or more blowers upstream and downstream of the VSA unit. The system can further comprise a buffer tank configured to receive at least a portion of an enriched gas stream.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIG. 1. A block diagram of one embodiment of a hydrogen purification system disclosed herein.

DESCRIPTION

Embodiments of the current disclosure relate to methods, processes, and systems for safely and reliably purifying hydrogen from a gas mixture containing hydrogen and oxygen, such as that produced by the photocatalytic water splitting process. The solution separates a gas containing hydrogen and oxygen produced by a photocatalytic water-splitting reaction using a vacuum swing adsorption (VSA) process.

I. Photocatalytic Water Splitting

Photocatalytic water splitting is the light-induced conversion reaction of water to hydrogen and oxygen. This reaction has attracted attention as one of the most promising hydrogen production processes. Photocatalytic water splitting is an artificial process for the dissociation of water into its constituent parts, hydrogen ($H_2$) and oxygen ($O_2$), using either artificial or natural light without producing greenhouse gases or having many adverse effects on the atmosphere. When $H_2O$ is split into $O_2$ and $H_2$, the stoichiometric ratio of its products is 2:1.

There are several requirements for a photocatalyst to be useful for water splitting. The minimum potential difference (voltage) needed to split water is 1.23V at 0 pH. Since the minimum band gap for successful water splitting at pH=0 is 1.23 eV the electrochemical requirements can theoretically reach down into infrared light, albeit with negligible catalytic activity. These values are true only for a completely reversible reaction at standard temperature and pressure (1 bar and 25° C.). Theoretically, infrared light has enough energy to split water into hydrogen and oxygen; however, this reaction is kinetically very slow because the wavelength is greater than 380 nm. The potential must be less than 3.0V to make efficient use of the energy present across the full spectrum of sunlight. Water splitting can transfer charges, but not be able to avoid corrosion for long term stability. Defects within crystalline photocatalysts can act as recombination sites, ultimately lowering efficiency.

Materials used in photocatalytic water splitting fulfill the band requirements and typically have dopants and/or co-catalysts added to optimize their performance. A sample semiconductor with the proper band structure is titanium dioxide ($TiO_2$). However, due to the relatively positive conduction band of $TiO_2$, there is little driving force for $H_2$ production, so $TiO_2$ is typically used with a co-catalyst such as platinum (Pt) to increase the rate of $H_2$ production. It is routine to add co-catalysts to spur $H_2$ evolution in most photocatalysts due to the conduction band placement. Most semiconductors with suitable band structures to split water absorb mostly UV light; in order to absorb visible light, it is necessary to narrow the band gap.

Photocatalysts can suffer from catalyst decay and recombination under operating conditions. In certain aspects catalyst decay becomes a problem when using a sulfide-based photocatalyst such as cadmium sulfide (CdS), as the sulfide in the catalyst is oxidized to elemental sulfur at the same potentials used to split water. Thus, sulfide-based photocatalysts are not viable without sacrificial reagents such as sodium sulfide to replenish any sulfur lost, which effectively changes the main reaction to one of hydrogen evolution as opposed to water splitting. Recombination of the electron-hole pairs needed for photocatalysis can occur with any catalyst and is dependent on the defects and surface area of the catalyst; thus, a high degree of crystallinity is required to avoid recombination at the defects.

Examples of photocatalyst include, but are not limited to $NaTaO_3$:La, $K_3Ta_3B_2O_{12}$, $(Ga_{0.82}Zn_{0.18})(N_{0.82}O_{0.18})$, $Pt/TiO_2$, and Cobalt based systems.

$NaTaO_3$:La—$NaTaO_3$:La yields a high water splitting rate of photocatalysts without using sacrificial reagents. The nanostep structure of the material promotes water splitting as edges functioned as $H_2$ production sites and the grooves functioned as $O_2$ production sites. Addition of NiO particles as co-catalysts assisted in $H_2$ production; this step can be done by using an impregnation method with an aqueous solution of $Ni(NO_3).6H_2O$ and evaporating the solution in the presence of the photocatalyst.

$K_3Ta_3B_2O_{12}$—$K_3Ta_3B_2O_{12}$ is activated by UV light and above, does not have the performance or quantum yield of $NaTaO_3$:La. However, it does have the ability to split water without the assistance of co-catalysts. This ability is due to the pillared structure of the photocatalyst, which involves $TaO_6$ pillars connected by $BO_3$ triangle units.

$(Ga_{0.82}Zn_{0.18})(N_{0.82}O_{0.18})$—$(Ga_{0.82}Zn_{0.18})(N_{0.82}O_{0.18})$ has a high quantum yield in visible light for visible light-based photocatalysts that do not utilize sacrificial reagents. Tuning the catalyst is done by increasing calcination temperatures for the final step in synthesizing the catalyst. Temperatures up to 600° C. helped to reduce the number of defects, though temperatures above 700° C. can destroy the local structure around zinc atoms.

$Pt/TiO_2$—$TiO_2$ is a very efficient photocatalyst, as it yields both a high quantum number and a high rate of $H_2$ gas evolution, e.g., $Pt/TiO_2$ (anatase phase). These photocatalysts combine with a thin NaOH aqueous layer to make a solution that can split water into $H_2$ and $O_2$. $TiO_2$ absorbs only ultraviolet light due to its large band gap (>3.0 ev), but outperforms most visible light photocatalysts because it does not photocorrode as easily. Most ceramic materials have large band gaps and thus have stronger covalent bonds than other semiconductors with lower band gaps.

Cobalt based systems—Photocatalysts based on cobalt have been reported. Members are tris(bipyridine) cobalt(II), compounds of cobalt ligated to certain cyclic polyamines, and certain cobaloximes. Chromophores have reportedly been connected to part of a larger organic ring that surrounded a cobalt atom. The process is less efficient than using a platinum catalyst, but cobalt is less expensive, potentially reducing total costs. The process uses one of two supramolecular assemblies based on Co(II)-templated coordination as photosensitizers and electron donors to a cobaloxime macrocycle.

II. Hydrogen Purification

The gas produced from the photocatalytic water-splitting process is at or near atmospheric pressure (about 1 bar) and can contain about 70% mol $H_2$, 25% mol $O_2$ and 5% mol $CO_2$. This gas can be used as a feed source for processing by VSA.

A feed source comprising $H_2$ and $O_2$ is sent to a vacuum swing adsorption (VSA) separation unit. VSA is a non-cryogenic gas separation technology. Using special solids, or adsorbents, VSA segregates certain gases from a gaseous mixture under minimal pressure according to the species' molecular characteristics and affinity for the adsorbents. These adsorbents (e.g., CMS or zeolites) form a molecular sieve and preferentially adsorb the target gas species at near ambient pressure—producing a product gas. Once a certain volume or mass of feed source has been processed, a vacuum is applied to the adsorbent to regenerate the adsorbent material and alternatively capture the adsorbed molecules.

VSA differs from cryogenic distillation techniques of gas separation as well as pressure swing adsorption (PSA) techniques because it operates at near-ambient temperatures and pressures. VSA differs primarily from PSA in that PSA typically vents to atmospheric pressures, and uses a pressurized gas feed in the separation process. VSA typically draws the gas through the separation process with a vacuum or blower. Hybrid VPSA systems also exist. VPSA systems apply pressurized gas to the separation process and also apply a vacuum for desorption.

Certain embodiments of a VSA process can include passing a feed source through an adsorption vessel and collecting an enriched product gas, and regenerating the adsorbing material or adsorption medium by exposing the adsorption medium to a vacuum. A feed source can be passed through an adsorption vessel and adsorption zone at about a pressure of approximately 0.8 to 1.2 bar, the adsorption zone can contain an adsorbent selective to retain oxygen, wherein the oxygen is adsorbed and hydrogen gas passes through the zone essentially unadsorbed producing a hydrogen enriched product gas, or vice versa. When needed, the adsorption material can be regenerated by evacuating the adsorption vessel to a predetermined reduced pressure at which point the oxygen is desorbed and collected as a purge gas from the adsorption vessel. After application of a vacuum for a sufficient time the vacuum is released and the adsorption vessel is brought back to an appropriate feed pressure and the process of adsorption is repeated.

The adsorbent of the present invention can be incorporated into solid particles in which the adsorbent is present in an amount effective to promote the desired separation. Solid particles comprising the molecular sieve and a binder may be formed into shapes such as pills, pellets, granules, rings, spheres, etc. Generally, a slurry mixture comprising the molecular sieve, binder, and water is prepared and the slurry mixture is blended by sonification, milling, etc. prior to formation of the solid particles by extrusion, spray-drying, etc. In one aspect, the solid particles comprise an adsorptively effective amount of the adsorbent and at least one matrix material, preferably selected from the group consisting of binder materials, filler materials, and mixtures thereof to provide a desired property or properties, e.g., desired adsorbent dilution, mechanical strength, and the like to the solid particles. Filler and binder materials include, for example, synthetic and naturally occurring substances such as metal oxides, clays, silicas, aluminas, silica-aluminas, silica-magnesias, silica-zirconias, silica-thorias, silica-berylias, silica-titanias, silica-alumina-thorias, silica-alumina-zirconias, aluminophosphates, mixtures of these, and the like. The preparation of solid particles comprising adsorbent and matrix materials is conventional and well known in the art and, therefore, need not be discussed in detail.

FIG. 1 illustrates a flow diagram for one embodiment of the system. FIG. 1 illustrates a scheme where reactants (e.g., water and sacrificial agent) and catalyst are provided in reactor 100 where photocatalytic water splitting is performed. Once the water is split the resulting gas is transferred to absorber (VSA) vessel 102 via blower 104. In absorber vessel 102 the feed source is exposed to a adsorption medium that selectively adsorbs oxygen or hydrogen. The product gas (hydrogen or oxygen) can be recycled via blower 106 or further processed. The absorbate is collected as a purge gas by applying a vacuum to the absorber vessel to desorb the adsorbed gas. In one embodiment blower 104 or 106 can be used to move a source feed gas through the absorber vessel or apply a vacuum to the absorber vessel to desorb and regenerate the adsorption medium. Product gas or purge gas can be transferred to one or more buffer tank for storage or further processing needs. In one embodiment a hydrogen product gas can be injected into the feed stream to modulate the explosivity/flammability of the feed source.

One embodiment of the vacuum swing adsorption process can comprise one or more vacuum swing adsorption cycles being performed concurrently in 2 or more adsorption vessels, and in certain aspects asynchronously (i.e., each concurrent process being at different stages—adsorption, purge, etc.) that can be employed to purify the feed source to produce a high purity hydrogen product. Included in certain aspects of a vacuum swing adsorption cycle is an adsorption step, a vacuum purge step, and a repressurization step. An adsorption bed receives a feed source and undergoes an adsorption step to adsorb a feed source component on the adsorbent producing a product gas. At the conclusion of the adsorption step, prior to breakthrough, the adsorption bed can purged with a co-purge stream such as an adsorbent gas or inert gas purge to force non-adsorbed gas from the void spaces of the adsorption bed. The adsorption bed undergoes a depressurization step to a purge pressure or vacuum and a purge stream is withdrawn. The adsorption bed can be evacuated to a pressure of about 0.5 psi. The adsorption bed be repressurized or allowed to return to ambient pressure. The adsorption and desorption process can be repeated.

The examples as well as the figures are included to demonstrate preferred embodiments of the invention. It should be appreciated by those of skill in the art that the techniques disclosed in the examples or FIGURES represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The invention claimed is:

1. A process for separating hydrogen and oxygen from a gas mixture produced from photocatalytic splitting of water comprising:
   (a) separating hydrogen and oxygen at about atmospheric pressure from a feed source by
      (i) passing the feed source through a vacuum swing adsorption separation unit containing an adsorption medium comprising a carbon molecular sieve that selectively adsorbs hydrogen from the feed source producing an enriched oxygen product gas and an adsorption medium enriched in hydrogen; and
      (ii) desorbing the adsorbed hydrogen by exposing the hydrogen enriched adsorption medium to a vacuum forming an hydrogen enriched purge gas and a regenerated adsorption medium, wherein the desorption process is performed at 15 to 60° C. and a pressure of about 0.1 mbar to 0.5 bar; and
   (b) collecting, storing, or utilizing the product gas and purge gas.

2. The process of claim 1, wherein the adsorption process is performed at 15 to 60° C.

3. The process of claim 1, wherein two or more blowers are employed upstream and downstream of the vacuum swing adsorption unit.

4. The process of claim 1, wherein the adsorption medium further comprises a metal oxide.

5. The process of claim 1, wherein the adsorption process is performed at a pressure of 0.8 bar.

6. The process of claim 1, wherein the adsorption medium further comprises a silica-magnesia.

7. The process of claim 1, wherein the desorption process is performed at a pressure of about 0.1 mbar.

8. The process of claim 3, wherein the desorption process is performed at a pressure of about 0.1 mbar.

9. The process of claim 1, further comprising filtering and dehydrating the feed source prior to separating hydrogen and oxygen.

10. The process of claim 1, wherein the adsorption medium comprises a 5 angstrom zeolite.

11. The process of claim 1, wherein the adsorption medium further comprises at least one member selected from the group consisting of metal oxide, a clay, a silica, an alumina, a silica-alumina, a silica-magnesia, a silica-zirconia, a silica-thoria, a silica-berylia, a silica-titania, a silica-alumina-thoria, a silica-alumina-zirconia and aluminophosphates.

12. The process of claim 1, wherein the feed source comprises about 70 mol % hydrogen.

13. The process of claim 1, wherein the enriched hydrogen stream comprises at least 95 mol % hydrogen.

14. The process of claim 1, wherein the process is performed under conditions and using equipment to minimize spark generation.

15. The process of claim 1, wherein the adsorption medium further comprises silica-alumina-thoria.

16. The process of claim 1, wherein the adsorption medium further comprises silica-thoria.

17. The process of claim 1, wherein the adsorption medium further comprises a silica-berylia.

* * * * *